(12) United States Patent
Sroka et al.

(10) Patent No.: US 9,550,272 B2
(45) Date of Patent: Jan. 24, 2017

(54) MAGNETIC FIXTURE

(75) Inventors: Gary Sroka, Missouri City, TX (US);
Omer El-Saeed, Houston, TX (US)

(73) Assignee: REM Technologies, Inc., Southington, CT (US)

( * ) Notice: Subject to any disclaimer, the term of this patent is extended or adjusted under 35 U.S.C. 154(b) by 822 days.

(21) Appl. No.: 12/620,140

(22) Filed: Nov. 17, 2009

(65) Prior Publication Data

US 2011/0117820 A1   May 19, 2011

(51) Int. Cl.
*B24B 31/02* (2006.01)
*B24B 31/03* (2006.01)
*B24B 31/06* (2006.01)
*B24B 41/06* (2012.01)
*B23Q 3/154* (2006.01)
*B25B 11/00* (2006.01)
*B24B 31/00* (2006.01)

(52) U.S. Cl.
CPC ............ *B24B 41/06* (2013.01); *B23Q 3/1543* (2013.01); *B23Q 3/1546* (2013.01); *B24B 31/003* (2013.01); *B24B 31/0224* (2013.01); *B24B 31/064* (2013.01); *B25B 11/002* (2013.01)

(58) Field of Classification Search
CPC ...... B24B 31/003; B24B 31/02; B24B 31/027; B24B 31/03; B24B 31/06; B24B 31/062; B24B 31/064; B24B 41/061; B25B 11/002; B23Q 3/1543; B23Q 3/1546
USPC .................. 451/36, 106, 113, 104, 326, 327, 328, 451/385, 397, 402
See application file for complete search history.

(56) References Cited

U.S. PATENT DOCUMENTS

| | | | |
|---|---|---|---|
| 2,913,853 A | | 11/1959 | Solem |
| 3,662,496 A | * | 5/1972 | Altenstaedter .......... B24B 31/10 451/104 |
| 3,776,827 A | | 12/1973 | Inoue |
| 4,446,656 A | * | 5/1984 | Kobayashi ............ B24B 31/064 451/113 |
| 4,818,333 A | | 4/1989 | Michaud |
| 5,074,078 A | * | 12/1991 | Renker ................. B24B 27/003 451/243 |
| 5,251,409 A | * | 10/1993 | Orbank ................ B24B 31/003 451/113 |
| 6,182,954 B1 | | 2/2001 | Zhang |
| 6,261,154 B1 | * | 7/2001 | McEneny ............... B24B 29/02 451/32 |
| 6,280,303 B1 | * | 8/2001 | Kawasaki ............. B24B 31/003 451/104 |

(Continued)

FOREIGN PATENT DOCUMENTS

EP   1 022 089 A1   7/2000
GB     847394       9/1957

(Continued)

OTHER PUBLICATIONS

PCT International Search Report, for PCT Serial No. PCT/IB2010/055210, mailed Mar. 23, 2011.

*Primary Examiner* — Eileen Morgan
(74) *Attorney, Agent, or Firm* — Jones Walker, LLP (57) ABSTRACT

A fixture is provided for retaining a metal workpiece for contact by finishing media during operation of a media based finishing operation. The fixture comprises a body and a magnet for retaining the workpiece in contact with the body. By use of super-magnetic materials a significant holding force may be achieved.

10 Claims, 10 Drawing Sheets

(56) References Cited

U.S. PATENT DOCUMENTS

| | | | |
|---|---|---|---|
| 6,406,356 B1* | 6/2002 | Brooks | B24B 31/003 451/104 |
| 6,688,953 B2* | 2/2004 | Kawasaki | B24B 1/00 451/106 |
| 6,918,818 B2 | 7/2005 | Rudiger | |
| 7,005,080 B2 | 2/2006 | Holland et al. | |
| 7,118,464 B2* | 10/2006 | Bolz | B24B 1/00 451/104 |
| 7,144,302 B2* | 12/2006 | Bolz | C23C 4/073 451/104 |
| 7,625,263 B2* | 12/2009 | Miyahara | B24B 29/02 451/287 |
| 2003/0216110 A1* | 11/2003 | Bohm | B24B 31/003 451/36 |
| 2004/0242134 A1* | 12/2004 | Lee | B24B 31/003 451/113 |
| 2005/0186889 A1* | 8/2005 | McNeil | B24B 31/003 451/36 |
| 2005/0202921 A1 | 9/2005 | Gangopadhyay | |
| 2007/0072523 A1* | 3/2007 | Miyahara | B24B 29/02 451/290 |
| 2007/0238397 A1* | 10/2007 | Dyer | B24B 31/003 451/36 |
| 2011/0109029 A1* | 5/2011 | Takeda | B05B 13/0264 269/8 |
| 2012/0021674 A1* | 1/2012 | Schroeter | B24B 31/06 451/28 |

FOREIGN PATENT DOCUMENTS

| | | | |
|---|---|---|---|
| GB | 1018759 A | | 12/1964 |
| JP | 57189764 A | | 11/1982 |
| JP | 2002239803 | | 8/2002 |

* cited by examiner

MAGNETIC FIXTURE

BACKGROUND OF THE INVENTION

1. Field of the Invention

The invention relates generally to fixturing arrangements and more particularly to fixturing arrangements for releasably mounting metal components to be treated in a media based finishing process. The invention also relates to methods of finishing engineering components in particular batch finishing where a large number of components are finished together.

2. Description of the Related Art

Procedures for producing a smooth surface finish on metallic components are generally well known. Such procedures include barrel tumbling, abrasive vibratory finishing, grinding, honing, abrasive machining and lapping. Examples of mechanical parts that may be finished using these procedures include splines, crankshafts, camshafts, bearings, gears, continuous velocity (CV) joints, couplings, and journals. Various advantages may be achieved by such finishing including a reduction in wear, friction, noise, vibration, contact fatigue, bending fatigue and operating temperature in the mechanism to which they relate.

The present invention is concerned with media based processes in which a workpiece is acted upon by freely moving particles or granules of an abrasive or non-abrasive medium or by a fluid. These processes may be distinguished from machining processes in which a machining tool acts on the surface of the workpiece.

In the automotive industry, there is an ongoing desire to improve efficiency and performance in order to produce more environmentally friendly vehicles. One area of interest lies in improving the surface finish of certain critical components. At present, a major contributor to drive train friction is the rear axle ring and pinion gearset. Media based finishing processes have been identified as a suitable way to achieve the required degree of smoothness for such components. This is discussed in a number of publications including US2005/0202921A1. As yet however such processes are not able to achieve the production volumes required by the industry in a cost-effective manner.

Various media based techniques are available. Early vibratory finishing techniques used motor-driven vibratory bowls or tubs in which the component would be free floated and allowed to agitate in the presence of abrasive media. By free floated, it is meant the components are allowed to be carried around the vessel by the movement of the media mass. The degree and rate of finishing is primarily controlled by the coarseness, amount and or replenishment of the abrasive grit used in the media mass. Such processes are based on the mass finishing techniques used, for example, for polishing stainless steel tool handles in which ever finer polishing media is used to achieve the desired degree of finish. These procedures are generally recognized as being, too slow for use on hardened engineering components such as case-carburized gearsets.

Further procedures have been developed in which increased levels of mechanical energy are imparted onto the component by moving the component through relatively stationary media. One such procedure is known as drag finishing and is described in e.g. U.S. Pat. No. 4,446,656 to Kobayashi, Another drag finishing machine is described in U.S. Pat. No. 6,918,818 to Böhm, the contents of which are also incorporated herein by reference in their entirety. In this device, individual components may be fixtured to a drive spindle for finishing. The total throughput of components is determined by the process time and the fixturing time for connecting and disconnecting components from the drag spindle.

Another procedure that can achieve an ultra-smooth superfinished surface is chemically accelerated vibratory finishing (CAVF). A chemically accelerated vibratory finishing technique has been developed and described in numerous publications by REM Chemicals, Inc. This technique may be used to refine metal parts to a smooth and shiny surface and has been used commercially for many years. U.S. Pat. No. 4,818,333 to Michaud and U.S. Pat. No. 7,005,080 to Holland, the contents of which are incorporated herein by reference in their entirety, disclose this improved finishing technique. The use of such processes in the automotive industry has been described in an article by Winkelmann, L., J. Holland and R. Nanning in AGMA Paper 04FTM13, entitled "Superfinishing Motor Vehicle Ring and Pinion Gears". With such a process, a desired finish of around 0.25 micron Ra may be achieved in 30-60 minutes. Such a process is generally unacceptably long for integration into a production line environment.

A number of media based processes can be carried out as batch processes in a bowl or tub on a number of parts at a time. This can reduce the processing time per part but it can unfortunately also lead to components knocking against one another, causing damage and resulting in scrapped parts. Furthermore, it is not convenient for components that have been individually identified or matched. For gear assemblies, it is often the case that two or more components are matched as a gear-set, for example, by a lapping process. Thereafter, it is desirable that the matched parts are kept together during subsequent operations. For such components, batch finishing is generally not suitable as it requires complicated marking and subsequent identification of all components.

In an attempt to overcome the problems of batch processes, vibratory machines have been partitioned with dividers. This is however only practical with a small number of partitions whereby relatively few gear-sets can be finished in each machine. Another problem is that parts are prone to lodge in corners of the bowl, resulting in a non-uniform finish and scrapping of the part. According to GB1018759A, individual containers containing workpieces and finishing medium may be located upon a vibratory machine. The containers are attached to a carrier table by magnets. Such an arrangement of individual containers would not appear practical in keeping large numbers of components separate from one another. It is also doubted that it would be effective on metal components which would themselves be attracted by the magnets.

In conventional machining processes, fixturing devices are used to locate workpieces and prevent them from moving. Various forms of fixturing device are known in the art including clamps, vices, chucks, jigs and the like. For production line manufacturing, any fixturing device must be easy to connect and release, since these procedures will usually add to the overall process time. Fixturing devices of this type are not however commonplace in media based processes and do not appear readily suited for such use. The media used is often relatively small and can become easily lodged in screw threads, clamps and tool openings such as screw and bolt heads. Additionally, the finishing process itself can be detrimental to such fixtures making them difficult to open. For these reasons, conventional mechanical fixtures are not ideally suited for use in media based finishing environments.

A number of magnetic devices are known in which electromagnetic clamps are used which can easily be switched on and off in order to retain and release a workpiece. Examples of such devices are shown in GB847394, EP 1022089 A2 and U.S. Pat. No. 2,913,853. These devices would also not lend themselves to use in a media based finishing environment, where the workpiece is substantially surrounded by and free-floated in the media. Operating with active aqueous chemistry would also pose a serious safety risk. Furthermore, such fixturing devices must be adequately protected from ingress of media or finishing chemistry.

In an alternative device for media based finishing shown in JP57189764A, an electromagnet is used for the purpose of delivering workpieces to a vibratory bowl. The workpieces are guided to move spirally within the bowl by a guide part. Although some reduction in contact damage between components may be achieved, the arrangement does not separately retain matched components and is not suitable for all shapes and size of workpiece.

Thus, there is a particular need for a device and procedure that allows at least some of these problems to be overcome.

BRIEF SUMMARY OF THE INVENTION

The present invention addresses these problems by the use of a magnet to retain a metal workpiece during a media based finishing operation. In this manner simplified connection and disconnection may be achieved and the workpieces can be prevented from knocking, and damaging one another even in a batch process. Furthermore, the magnet can be used to keep particular components together and simplify subsequent identification. Magnets can be quickly and easily released with little additional process time and are generally sufficiently strong to withstand the forces applied in e.g. vibratory bowls.

In one preferred embodiment, the method may take place in a drag-finishing machine having a drive arrangement arranged to drive or push the magnetic fixture through the media. In this context, a drag-finishing machine is understood to be a machine that applies a resultant force to the workpiece to establish relative movement between the media and the workpiece. This may be achieved by moving the workpiece through the media, moving the media past the workpiece, or a combination of both. In general, the forces acting upon a workpiece during drag finishing are greater than those experienced in conventional vibratory finishing. For this reason, it is preferred that the magnetic fixture is generally behind the workpiece in the direction of the relative movement. The force of the media will then act to press the workpiece onto the fixture and the strength of the magnets required may then be lower than had the fixture led the workpiece.

In an alternative embodiment of the invention, the process may take place in a vibratory mounted tub or bowl. As the skilled person will understand, such a tub or bowl may be filled with appropriate media and chemistry as required in order to perform a vibratory finishing process.

According to an important aspect of the invention, the magnetic is provided on or in a fixture which is freely moveable within the receptacle about at least one axis. Free movement in this context is understood to distinguish from arrangements where the fixture is either rigidly connected to or driven by part of the machine. Since the fixture may rotate freely about an axis, the workpiece may also rotate with the same freedom. Such free movement may be provided by a free-wheeling axle shaft or disk on which the fixture is mounted. In certain embodiments, the fixture is preferably freely moveable in all directions of movement. In particular, for operation in a vibratory tub or bowl, the fixture itself may be free-floated within the bowl, carrying the workpiece or workpieces. This may have various advantages as will be understood from the following.

In one embodiment, a plurality of magnetic fixtures may be mounted together on a mounting structure. This may allow a number of workpieces to be loaded onto the single mounting structure and thereafter handled as a single unit. The number of fixtures and/or workpieces may vary from two, to a hundred or more. The workpieces may be transported together to and from the finishing machine and may be finished together e.g whereby the whole mounting structure is immersed in the media.

In a further embodiment, each workpiece may comprise a plurality of matched components mounted together on the fixture. The fixture thus serves to identify the matched components and can also ensure that all of the components are subjected to the same or similar finishing process and conditions. The components could comprise a pair of matched gears such as a ring and pinion. Alternatively, they could comprise a complete mechanism, such as all the gears from a particular gearbox.

In an embodiment of the invention, the drive arrangement may comprise a force limiting control to limit a force applied to the magnetic fixture to a value lower than a retention force between the magnetic fixture and the workpiece. Active control of the drive arrangement in this manner may serve to avoid workpieces becoming separated from their fixtures. The skilled person will understand that various indicators can be used to prevent disengagement including contact and proximity sensors between the workpiece and the fixture. In response to excess force or (imminent) disconnection of a workpiece, the drive arrangement may be stopped or its speed reduced.

The invention also relates to a fixture for retaining a metal workpiece for contact by finishing media during operation of a media based finishing operation, the fixture comprising a body and a magnet for retaining the workpiece in contact with the body. By use of such a fixture, the benefits of the process as described above may be realized.

In a most preferred embodiment, the magnet is a permanent magnet. In particular, the skilled person will understand that electromagnets may not be suitable for use with a fixture that is to be free-floated in a vibratory machine. For this reason, the fixture preferably does not comprise an electromagnet. Most preferably, the magnet is a so-called supermagnet such as a magnet based on the rare earth materials neodymium, samarium or the like.

In a further preferred embodiment the body comprises plastics material. An advantage of such plastics material is that it may be chosen to be substantially resistant to the finishing media and chemicals used. Furthermore, it may be relatively soft, preventing damage to either the workpieces or the media. Preferred plastics materials are organic engineering polymers such as high density polyethylene (HDP) and polyoxymethylene such as Delrin™ available from Dupont. Although plastics materials are preferred for their ease of manufacture and chemical resistance, many other materials could be employed, in particular non-magnetic materials that can withstand the chemistry being used. Such materials could include 316 stainless steel, brass and even wood.

In a particular embodiment of the invention, the magnet may be substantially embedded within the body. This allows the magnet to be protected by the body from exposure to the media. It also may prevent direct contact between the magnets and the workpiece. The magnet or magnets may be located within a bore or cavity of the body and subsequently sealed. Alternatively, they may be incorporated or encapsulated within a plastic body during a manufacturing or moulding procedure. Most preferably, the body has a smooth outer surface without openings or locations where media may lodge.

In a still further embodiment of the invention, the fixture may comprise a plurality of magnets. These may be arranged e.g. around a periphery of the fixture in a shape corresponding to a shape of the workpiece to be received. Alternatively, the plurality of magnets may be for retaining different workpieces or components.

Although the fixture may have a flat face for receiving the workpiece, in another preferred embodiment of the invention, the body may comprise a profiled seat. The seat is preferably of an at least partially complementary shape to the surface of the workpiece which it is to engage. By providing a profiled seat, the exact location of the workpiece may be better determined or maintained. Furthermore, accidental disconnection may be prevented since lateral forces may be resisted by mechanical engagement of the seat and workpiece. Such a seat may provide a certain amount of mechanical interference fit between the fixture and the workpiece. Nevertheless, the axial retaining force preventing separation of the workpiece is preferably provided primarily by the magnetic force of attraction. Preferably the magnetic force provides more than 60% of the axial retaining force, most preferably more than 90% of such force. The seat may also be provided with a seal such as an O-ring, lip, ridge or the like in order to prevent ingress of media or chemicals between the workpiece and the fixture.

In yet another preferred embodiment each workpiece may comprise a plurality of matched components and the body has a plurality of seats, each arranged for receiving a respective component. The seats may be provided on the same face or on different faces of the fixture. In a drag finishing embodiment it may be desirable that all components are located on the same face so that they are all exposed to similar media conditions. In a vibratory finishing arrangement components may be located on opposing faces.

The invention also relates to a mounting structure comprising a plurality of fixtures as described above. The mounting structure may take any number of different configurations according to the workpieces being finished and the finishing method employed. In one preferred form, the mounting structure comprises a plurality of arms mounted on an axle in a tree structure, each supporting a respective fixture in spaced relationship to one another.

For the reasons as described above, each fixture is preferably mounted to be freely rotatable on the mounting structure about at least one axis. The mounting structure itself may also be freely rotatable about one or more axes or may be arranged to be free floating within a vibratory tub or bowl. In one particular embodiment, the mounting structure may also carry spacing members arranged to space the fixtures from other objects to prevent damage to the workpieces. The spacing members may form a body of revolution, within which the workpieces and fixtures are located.

While the present invention is applicable to most mechanical components, a preferred application of the invention is to the finishing of ring and pinion gear sets. As discussed above, finishing such components is of great importance to the automotive industry and no adequate solution has yet been found for efficient processing of matched ring and pinion pairs.

The invention may be used in combination with a machine comprising a receptacle for containing a quantity of finishing media, a drive arrangement for inducing relative motion between the workpiece and the media whereby the magnetic fixture is for retaining the workpiece within the receptacle during the finishing procedure.

Preferably, the workpiece is retained substantially only by the magnet and is not significantly retained by other means. In use, an operator thus need only separate the workpiece from the magnet by the force required to overcome magnetic attraction. Additional locking and fixturing is not required and the process time associated with fixturing is significantly reduced.

According to a preferred method of use, the finishing operation comprises chemically accelerated finishing. This may be performed using vibratory motion or by drag finishing. In the latter case, the workpiece is preferably driven through the media ahead of the magnetic fixture such that the media exerts a force on the workpiece tending to press it against the fixture.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1:
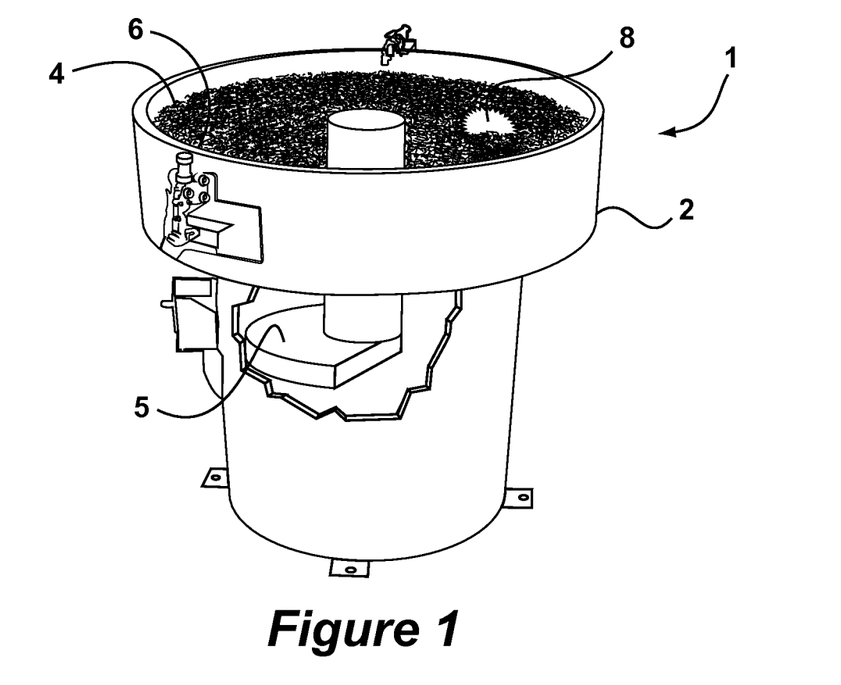
FIG. 1 is a schematic perspective view of a vibratory bowl for use with a first embodiment the invention.

The following is a description of certain embodiments of the invention, given by way of example only and with reference to the drawings. Referring to FIG. 1, a vibratory finishing machine 1 is shown in the form of a vibratory bowl 2. The bowl is substantially filled with non-abrasive finishing media 4 and finishing chemicals 6. A drive arrangement 5 is provided beneath the bowl 2 and serves to vibrate the bowl at a chosen frequency and amplitude of oscillation. In use in a conventional manner, workpieces 8 to be finished are placed freely in the bowl 2 and are acted upon by the media 4 and chemicals 6 according to e.g. the method described in U.S. Pat. No. 4,818,333 to Michaud. According to this method, the chemistry forms a conversion coating on the surfaces of the components being treated. Action of the media 4 causes the relatively soft coating to be removed from the high points of the surfaces, while leaving substantially intact the coating on the lower surface areas. The coating is continuously repaired over metal exposed during operation leading to a planarizing effect on the surface.

Figure 2:
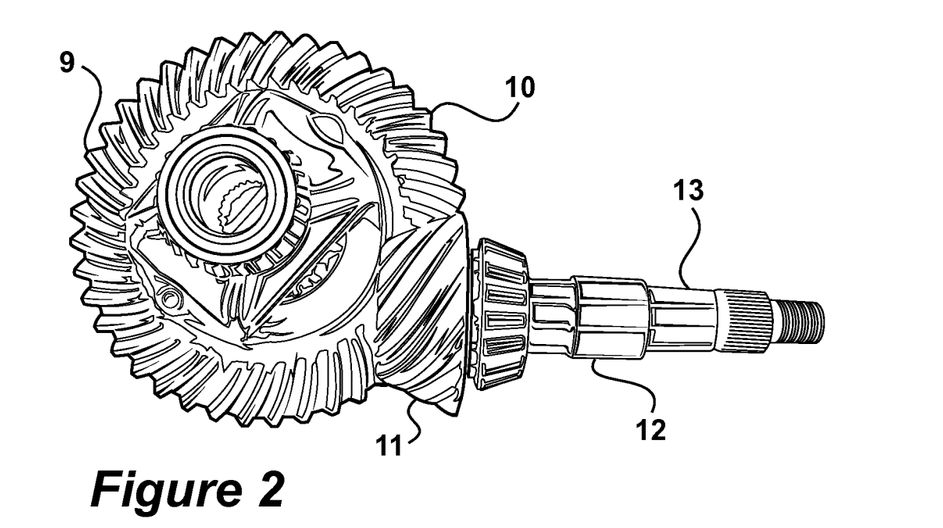
FIG. 2 is a schematic perspective view of a ring and pinion gear.

In FIG. 2, a ring 10 and pinion 12 assembly is shown. The ring 10 and pinion 12 form part of an automobile rear-axle and will be used in the following as exemplary workpiece components in relation to which the invention will be further explained. The skilled person will immediately understand that other components may also be finished in a similar manner and that the invention extends equally to machines, fixtures and methods for finishing any appropriate engineering components. The ring 10 is an annular element having a ring shaped gear surface 9. The pinion 12 has a hypoid gear surface 11 and a stub axle 13.

Figure 3:
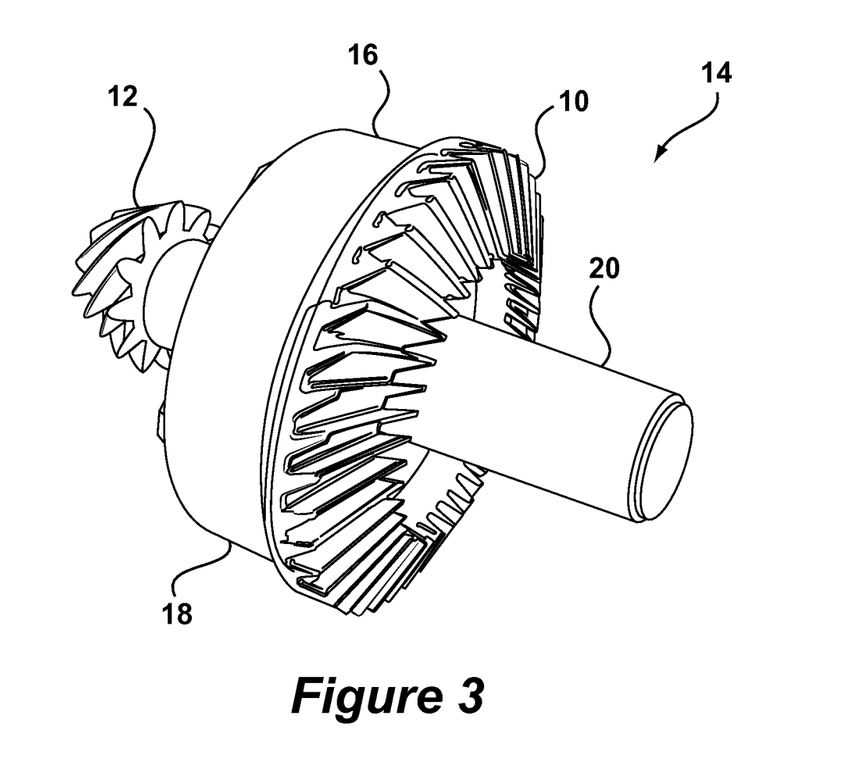
FIG. 3 is a perspective view of a fixture according to the first embodiment of the invention.

FIG. 3 shows a fixture 14 according to a first embodiment of the invention. The fixture 14 comprises a body 16 formed of a disk 18 and a shaft 20 onto which the ring 10 and pinion 12 are respectively connected. In the depicted embodiment, the body 16 is formed of a single piece of Delrin™.

Figure 4A:
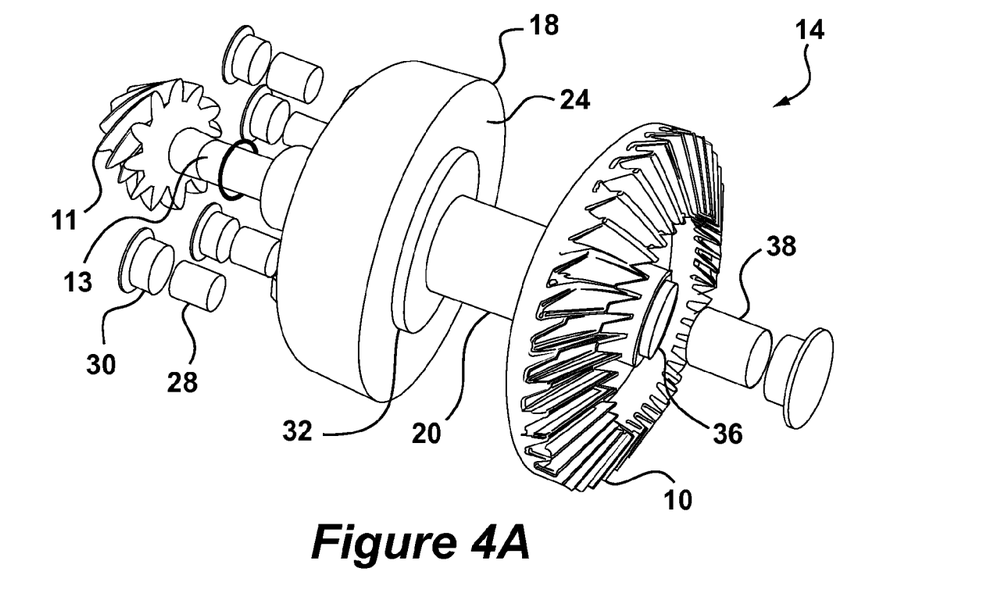
FIGS. 4A and 4B are exploded perspective views of the fixture of FIG. 3.
Figure 4B:
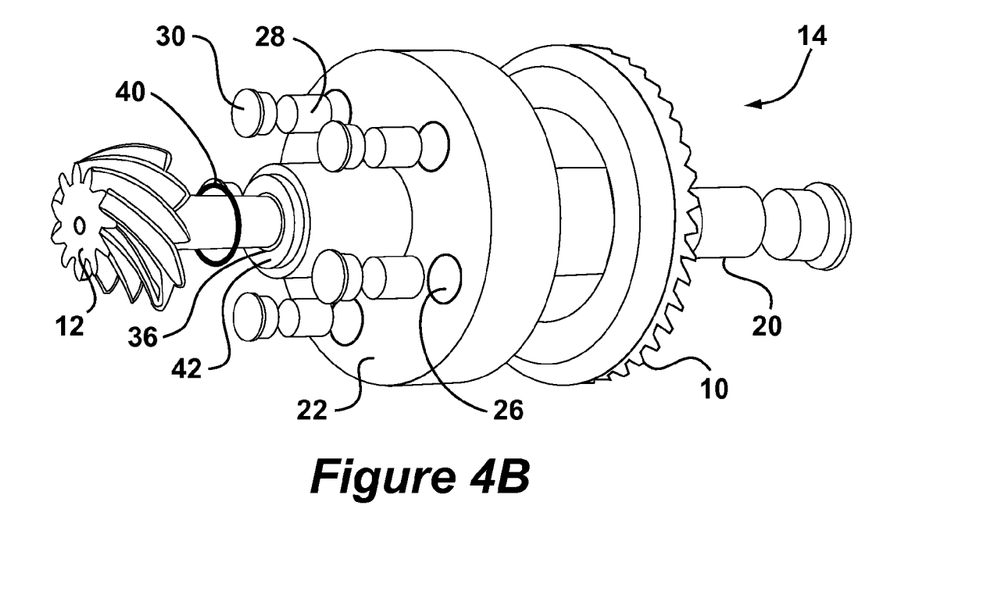

FIGS. 4A and 4B show exploded perspective views of the fixture 14 of FIG. 3 from two different angles. As can be seen, the disk 18 has a top face 22 and a bottom face 24. Bores 26 in the top face 22 extend through the disk to a distance of about 1.5 mm from the bottom face 24. Magnets 28 are received within the bores 26, which are closed by plugs 30 of Delrin™. The magnets 28 are formed of neodymium material ($Nd_2Fe_{14}B$) and each can exert a retaining force of around 4 Kg when acting through the material of the bottom face 24 of the disk 18 in this manner. Five bores 26 are spaced around the circumference of the disk 18, of which four can be seen in the Figures. Furthermore, a central bore 36 through the shaft 20 can also be seen. An O-ring 40 is arranged to provide a seal around the top surface 42 of the shaft 20. The bottom face 24 is provided with a seat 32 in the form of a step. The step corresponds in diameter with an inner diameter of the ring gear 10. A further magnet 38 can be seen located in the bottom end of the central bore 36. The further magnet 38 is larger in dimensions than the magnets 28.

The stub axle 13 can thus be inserted into the central bore 36 of the shaft 20 until it is engaged by the further magnet 38. This corresponds to the position where the base of the hypoid gear 11 has seated against the top surface of the shaft 20 and is in sealing engagement with the O-ring 40. During use, this sealing engagement protects the rear side of the hypoid gear 11 and stub axle 13 from entering into contact with finishing chemicals. To remove the ring 10 and pinion 12 from the fixture 14, the shaft 20 may be gripped tightly and a twisting motion applied to either the ring 10 or pinion 12 in order to break the magnetic attractive force. It will be understood that other arrangements and jigs may be provided to assist in removal of components from such fixtures.

Figure 5:
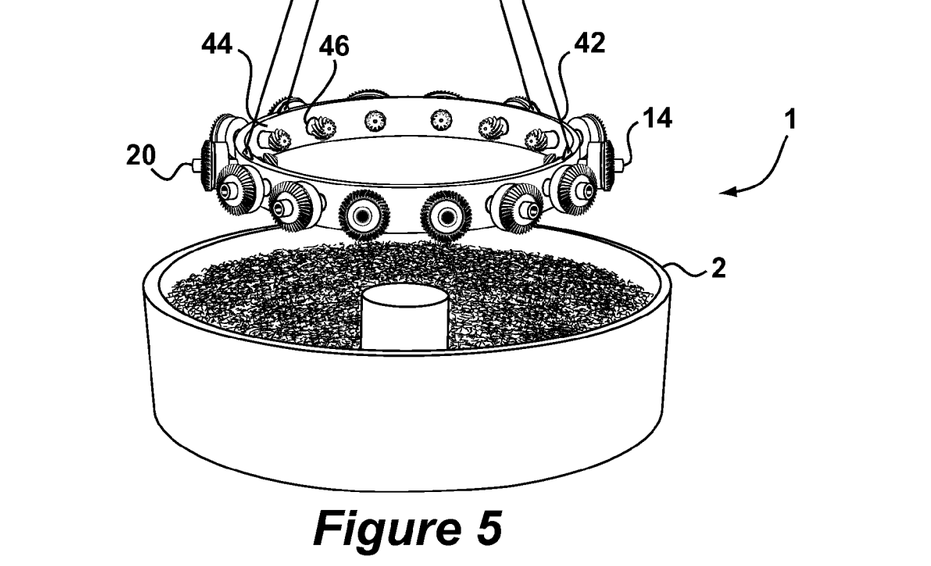
FIG. 5 shows a perspective view of fixtures in use according to the first embodiment of the invention.

The loaded fixture 14 may be used in the vibratory machine 1 as shown in FIG. 1. To this end, and as shown in FIG. 5, a mounting structure 42 is provided for mounting a plurality of fixtures 14. The mounting structure 42 comprises an annulus 44 having a plurality of openings 46 arranged around its circumference. The shaft 20 of each fixture 14 may be inserted through a respective opening 46 prior to attachment of the pinion gear 12. The fixtures 14 are freely rotatable within the openings 46. In this manner, a large number of fixtures 14 can be mounted onto the mounting structure 42. Once loading is complete, the complete mounting structure 42 may be lowered into the bowl 2 of the vibratory machine 1 and floated in the media 4. During use, the fixtures 14 are free to rotate around their respective shafts 20 allowing an even distribution of finishing action on the components. Using the process as described above, up to 40 components may be finished together in a total process time of about 60 minutes. Fixturing of the components onto the fixtures 14 and mounting structure 42 can take place off-line and does not therefore increase the total process time for the machine 1.

In an alternative (non-illustrated) embodiment, the fixture may be allowed to tumble freely in a bowl or tub. This may be the case where impact between workpieces is not a significant issue but nevertheless, pairing of matched components is desired. In the case of a freely tumbling version, it could also be desirable to locate both a ring and a pinion on the same face of the fixture in order to promote tumbling. Such an arrangement is shown below in the context of a second embodiment of the invention.

Figure 6:
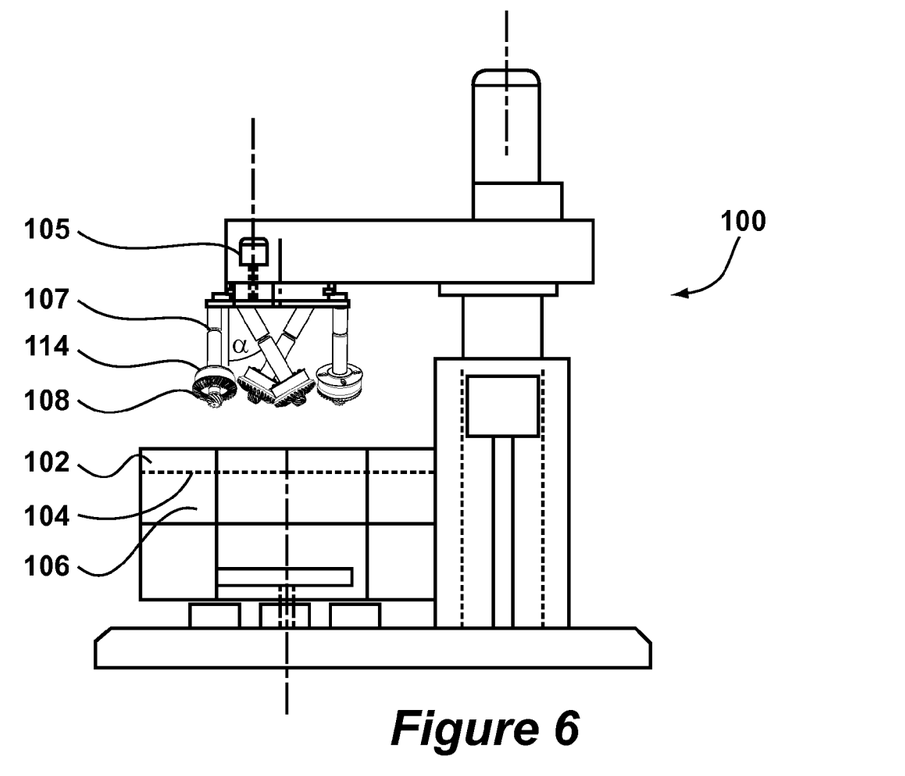
FIG. 6 shows a side elevation of a drag finishing machine for use with a second embodiment of the invention.

A second embodiment of the invention is shown in FIG. 6 for use in drag-finishing. In the description of this embodiment, like reference numerals preceded by 100 will be used to denote similar features.

According to FIG. 6, there is shown a drag-finishing machine 100 having a bowl 102 containing non-abrasive media 104. A drive arrangement 105 causes rotation of arms 107 to force workpieces 108 through the media 104. Each workpiece 108 is carried by a fixture 114. The arms 107 rotate together around the bowl 102 and also each rotates around its own axis. The arms 107 are positioned at an angle $\alpha$ with respect to the vertical. In addition to media 104, finishing chemistry 106 is provided in bowl 102 as described in co-pending application No. 61/215,981, the contents of which are hereby incorporated in their entirety. It will be understood that the invention is equally applicable to use with abrasive media in the absence of accelerating chemistry as carried out in conventional drag finishing processes.

Figure 7A:
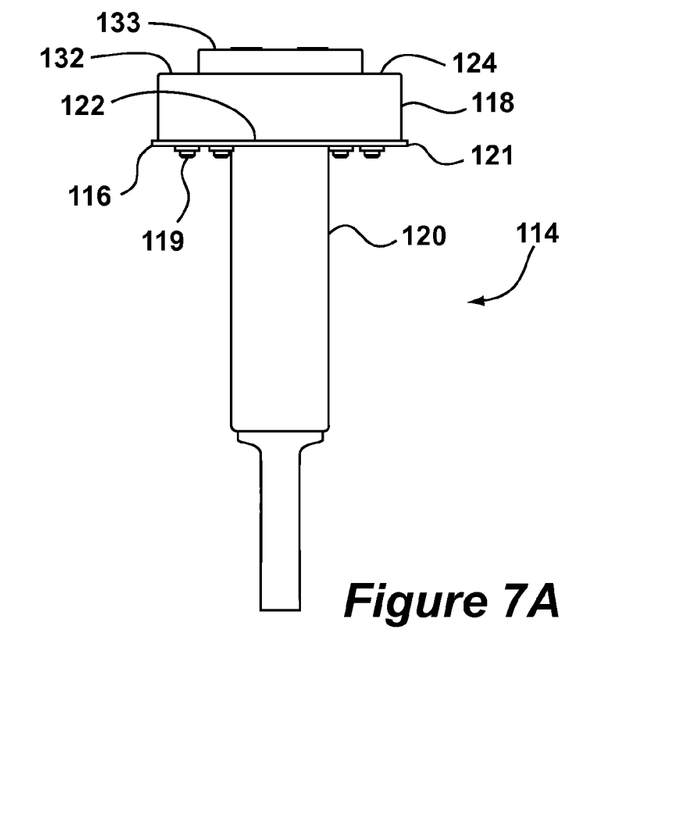
FIGS. 7A to 7D show various views of a fixture according to the second embodiment.

FIGS. 7A to 7D illustrate in further detail the fixture 114 for carrying a ring 110 and pinion 112 for finishing in the machine 100. Referring to FIG. 7A, the fixture 114 is shown in side view to comprises a body 116 formed of a disk 118 and a shaft 120. In the depicted embodiment, the disk 118 is formed of a single piece of Delrin™. The shaft 120 is made of steel and carries a plate 121 which is semi-permanently connected to a top face 122 of the disk 118 by bolts 119. The shaft 120 is connected in use to a respective arm 107 of the machine 100. The bottom face 124 is provided with a seat 132 and a step 133.

Figure 7B:
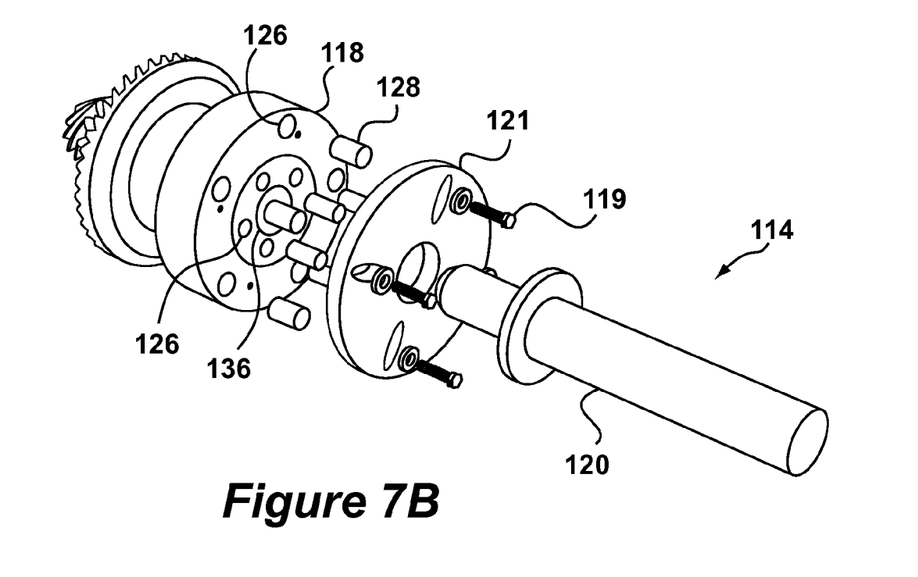

FIG. 7B shows an exploded perspective view of the fixture 114 whence is can be seen that the disk 118 has a central bore 136. A total of five bores 126 are distributed around the circumference of the disk 118. Five further bores 126 are distributed on the step 133 around the central bore 136. Each of the bores 126 houses a magnet 128 and is closed by a plug (not shown) as in the previous embodiment.

Figure 7C:
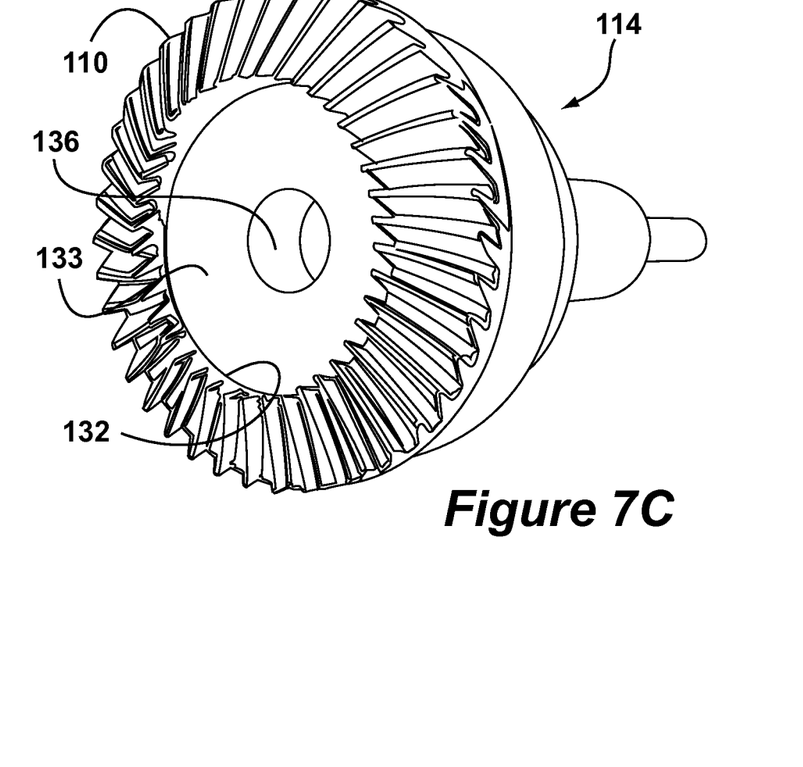

FIG. 7C shows a perspective view of the fixture 114 with the ring gear 110 attached and located by the seat 132 and step 133.

Figure 7D:
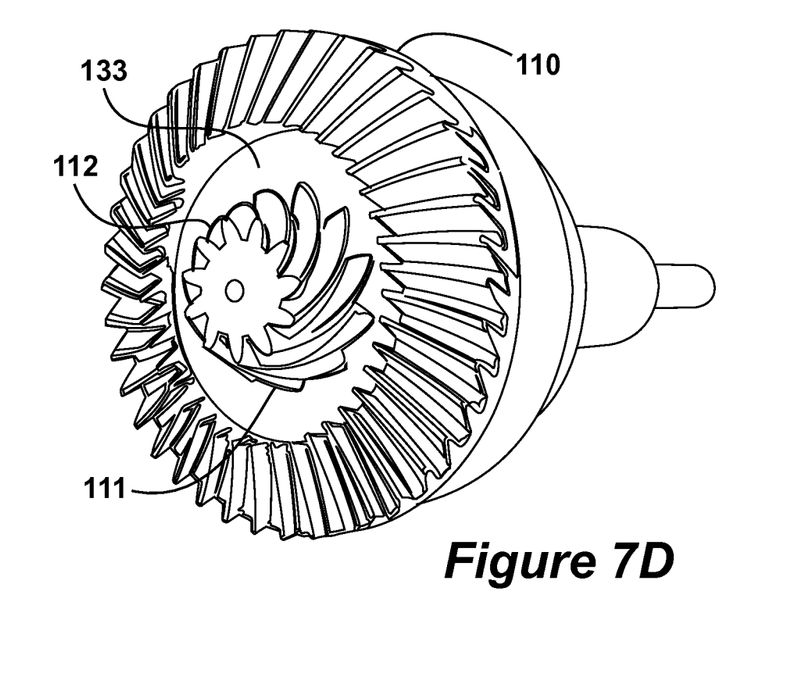

In FIG. 7D the pinion gear 112 is also attached. As can be seen, the pinion 112 sits on the step 133 within the ring gear 110. The stub axle 113 inserts within the central bore 136 and is sealed by interaction of an O-ring with the rear side of the hypoid gear 111.

In use of the machine 100, the drive arrangement 105 drives the arms 107 through the media 104 at the angle $\alpha$.

This ensures that the components 110, 112 are always pushed forwards through the media 104 by the fixture 114. Even though the forces encountered in the use of drag finishing machines are relatively high, disengagement of the magnets 128 is prevented by the fact that the media 104 acts to push the ring 110 and pinion 112 against their respective seats. Furthermore, the seat 132, step 133 and central bore 136 all act to restrain any lateral movement. On completion of the finishing procedure, the arms 107 may be raised from the bowl 102 and the ring 110 and pinion 112 can be physically pulled away from the fixture 114. It will of course be understood that appropriate levers, wedges or other implements may be used where necessary to assist this operation. After removal of the ring 110 and pinion 112 from the fixture 114, they may be demagnetized using conventional procedures.

Figure 8:
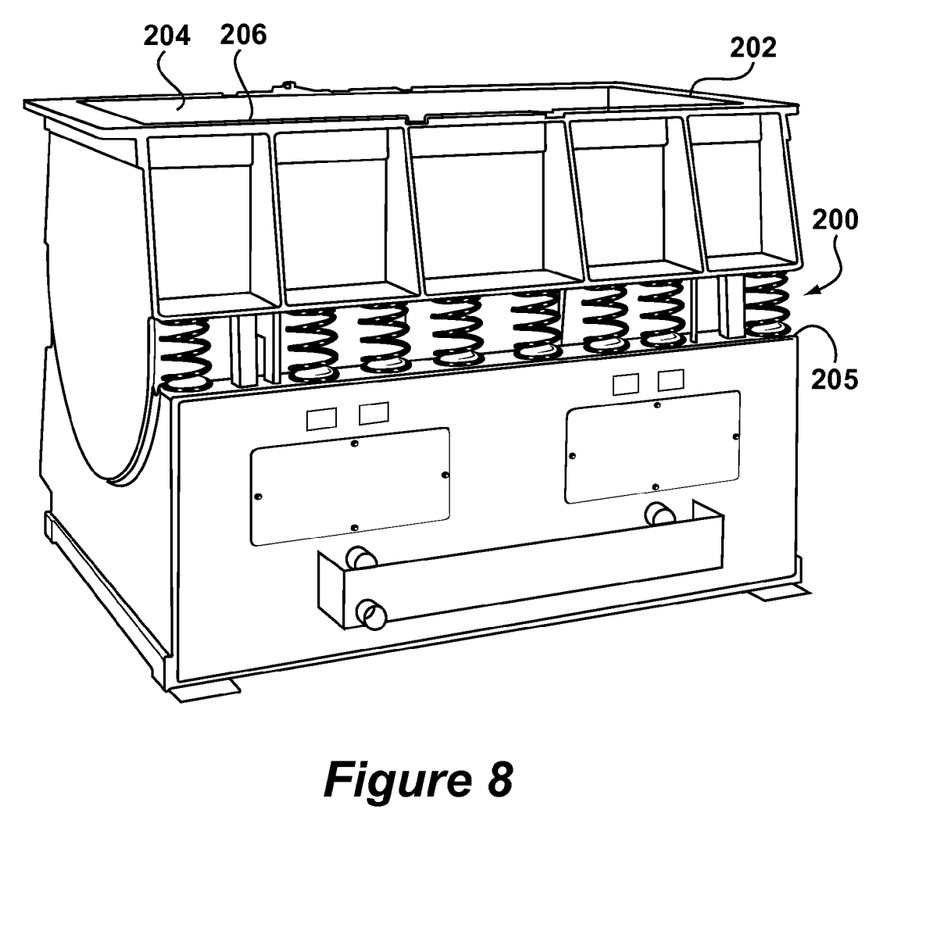
FIG. 8 shows a perspective view of a vibratory tub for use with a third embodiment of the invention.

A machine 200 according to a third embodiment of the invention is shown in FIG. 8. In the following, similar features to the first embodiment are denoted by like reference signs preceded by 200. The machine of FIG. 8 is in the form of an elongate vibratory tub 202 to be filled with media 204 and chemicals 206 as in the earlier embodiments. The tub 202 is driven to vibrate by a drive arrangement 205.

Figure 9A:
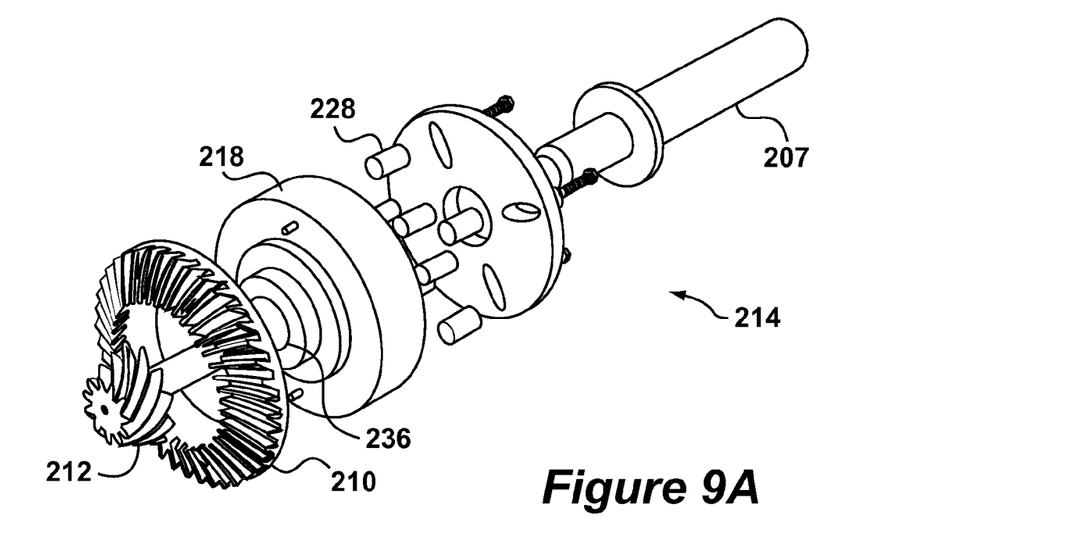
FIG. 9A shows an exploded perspective view of the fixture used in the third embodiment.

FIG. 9A shows a fixture 214 for use in the tub 202 of FIG. 8, in exploded view together with a ring 210 and pinion 212. The fixture 214 is substantially the same as that of FIGS. 7A-D and comprises disk 218, magnets 228 in bores (not shown) and central bore 236.

Figure 9B:
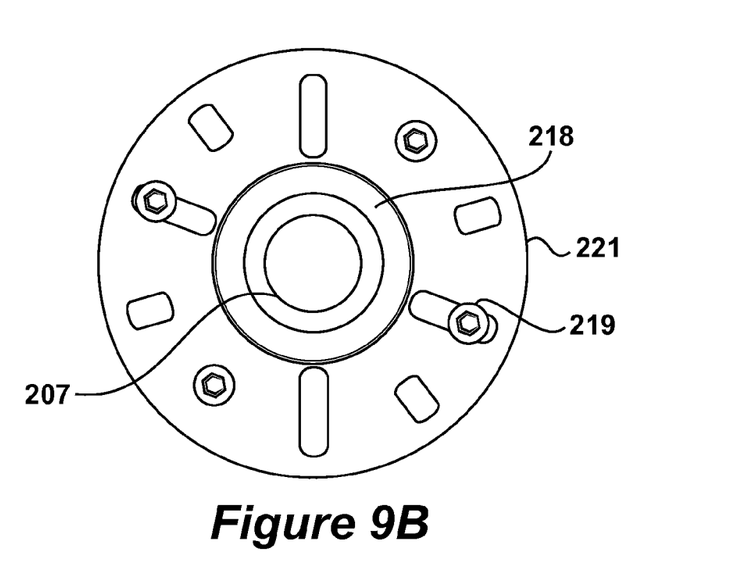
FIG. 9B shows a bottom view of the fixture of FIG. 9A.

FIG. 9B shows the fixture 214 in bottom view. The disk 218 is connected by bolts 219 to a plate 221 provided on arm 207 of a mounting structure 242.

Figure 10:
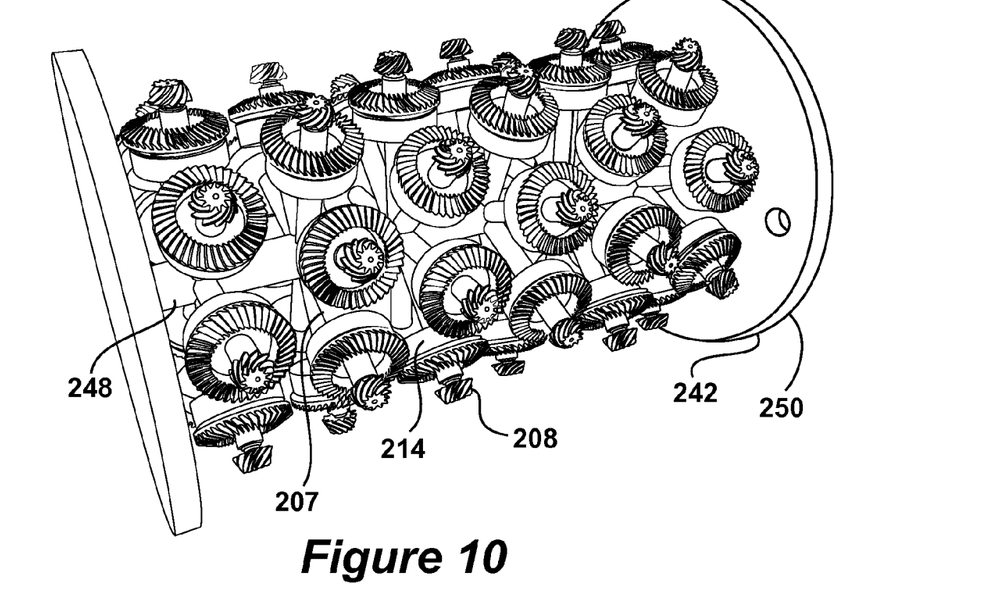
FIG. 10 shows a perspective view of a mounting structure according to the third embodiment.

The complete mounting structure 242 is shown in perspective view in FIG. 10. It comprises an axle 248 carrying a plurality of arms 207 extending radially from the axle 248 like spokes. The arms 248 are also spaced from each other along the length of the axle 248 and offset in the circumferential direction. Each arm 207 carries a respective fixture 214 and workpiece 208. In the illustrated embodiment a total of forty eight fixtures can be carried by the mounting structure 242 without interfering with one another. At either end of the axle 248 is a wheel 250. The wheels 250 are of such dimension that, when placed on a flat surface, they hold the fixtures 214 and workpieces 208 clear of the surface.

In use the mounting structure 242, fully loaded with workpieces 208, is lowered into the tub 202. On operating the drive arrangement 205, the mounting structure 242 sinks into the media 204 until it is submerged. Movement of the media 204 causes it to slowly rotate, whereby the wheels 250 guide it with respect to the sides and base of the tub 202. As it rotates, the different workpieces 208 are all exposed to similar finishing conditions. On completion, the whole mounting structure may be removed from the tub 202 and the workpieces 208 removed as in previous embodiments. Another fully loaded mounting structure 242 may be exchanged whereby processing in the tub 202 can continue almost uninterrupted.

Figure 11:
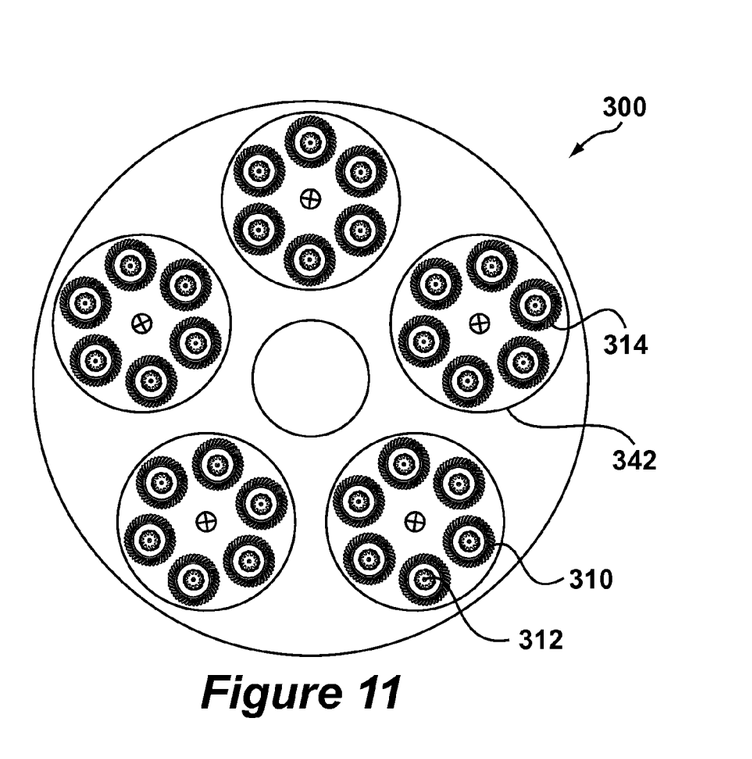
FIG. 11 shows a bottom view of a mounting structure according to a fourth embodiment of the invention.

Many other alternative embodiments and designs may be considered, depending upon the workpieces and components to be finished and the finishing machines available. According to FIG. 11, a further embodiment is shown of the underside of an arrangement 300 in which fixtures 314 are rotatably mounted on mounting structures 342 which can themselves rotate. The fixtures 314 are not shown in further detail but may be essentially identical to those of FIG. 7. The arrangement 300 can be placed over the hub of a vibratory bowl, with the rings 310 and pinions 312 immersed in the media. The mounting structures 342 may be driven to rotate or may be freely rotated by the media.

Figure 12:
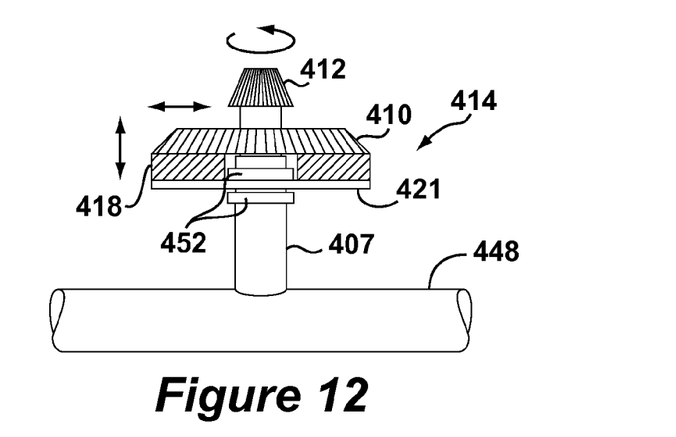
FIG. 12 shows a schematic side view of a fixture according to a fifth embodiment of the invention.

In a further alternative arrangement according to FIG. 12, a fixture 414 may be rotatably mounted on an arm 407 of the type used in FIG. 9 or FIG. 10, mounted to an axle 448. In this embodiment a plate 421 provided on the fixture 414 is bolted to the disk 418 on which a ring 410 and pinion 412 are held. The plate 421 is supported between spaced flanges 452. This allows the fixture 414 further freedom to move laterally and axially on the arm 407 and also to rotate with movement of the media.

Figure 13A:
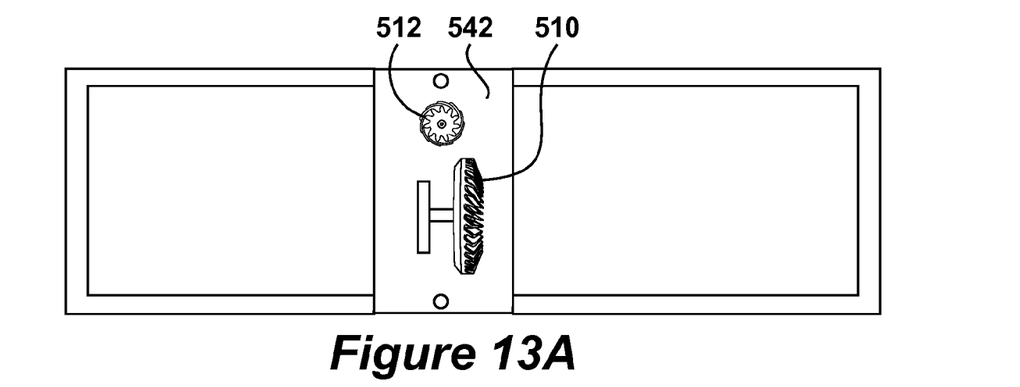
FIGS. 13A and 13B show respective bottom and side schematic views of a sixth embodiment of the invention.
Figure 13B:
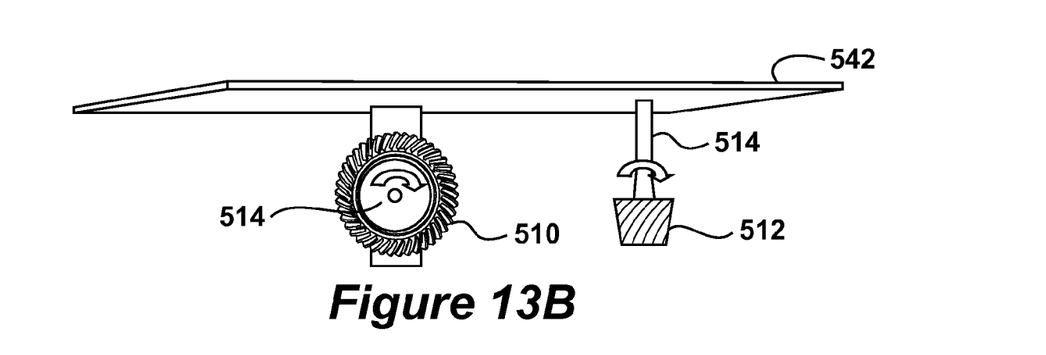

In a still further arrangement according to FIGS. 13A and 13B, a mounting structure 542 is arranged for mounting across a vibratory tub. A ring 510 and pinion 512 are separately mounted to magnetic fixtures 514 that are rotatably mounted to the mounting structure 542.

Thus, the invention has been described by reference to certain embodiments discussed above. It will be recognized that these embodiments are susceptible to still further modifications and alternative forms well known to those of skill in the art, in addition to those described above without departing from the spirit and scope of the invention. Accordingly, although specific embodiments have been described, these are examples only and are not limiting upon the scope of the invention.

What is claimed is:

1. A method for finishing a metal workpiece during a media based finishing operation carried out in a drag-finishing machine comprising a receptacle for containing a quantity of finishing media and having a drive arrangement for inducing relative motion between the workpiece and the media, the method comprising:
   providing a rotary element with a plurality of arms having first and second ends, wherein the arms extend from the rotary element from a first end at a fixed, non-perpendicular angle, wherein a magnetic fixture is retained at the second end, wherein the magnetic fixture comprises a body having a seat with a profile for locating the workpiece and a permanent magnet for retaining the workpiece in contact with the body, and wherein the magnet is substantially embedded within the body to protect the magnet from exposure to the media;
   retaining the metal workpiece with the magnetic fixture; and
   finishing the metal workpiece retained by the magnetic fixture in the media based finishing operation by driving the magnetic fixture through the media such that the workpiece is driven through the media ahead of the magnetic fixture ensures that the media exerts a force on the workpiece tending to press it against the seat of the magnetic fixture.

2. The method of claim 1, wherein the workpiece is retained substantially only by the magnet.

3. The method of claim 1, wherein the magnet comprises a super-magnet.

4. The method of claim 1, wherein the finishing operation comprises chemically accelerated finishing.

5. The method of claim 1, wherein the workpiece comprises a ring and pinion gear set.

6. The method of claim 1, wherein the receptacle is a vibratory mounted tub or bowl.

7. The method of claim 1, wherein the magnetic fixture is freely moveable within the receptacle about at least one axis.

8. The method of claim 1, wherein a plurality of magnetic fixtures are mounted together on a mounting structure.

9. The method of claim 1, wherein the workpiece comprises a plurality of matched components mounted together on the fixture.

10. The method of claim 1, further comprising controlling the drive arrangement to limit a force applied to the magnetic fixture to a value lower than a retention force between the magnetic fixture and the workpiece.

* * * * *